United States Patent
Kim et al.

(10) Patent No.: US 9,888,433 B2
(45) Date of Patent: Feb. 6, 2018

(54) MOBILE TERMINAL AND METHOD FOR CONTROLLING THE SAME

(71) Applicant: LG Electronics Inc., Seoul (KR)

(72) Inventors: Yoonkyum Kim, Seoul (KR); Jinhoon Kim, Seoul (KR); Eungjoo Lee, Seoul (KR); Baekju Lee, Seoul (KR); Yoonseok Choi, Seoul (KR); Yongsuk Lee, Seoul (KR); Yongock Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 223 days.

(21) Appl. No.: 14/830,512

(22) Filed: Aug. 19, 2015

(65) Prior Publication Data

US 2016/0219556 A1    Jul. 28, 2016

(30) Foreign Application Priority Data

Jan. 27, 2015 (KR) .................. 10-2015-0013009

(51) Int. Cl.
*H04W 4/00* (2009.01)
*H04W 48/16* (2009.01)
*H04W 48/18* (2009.01)

(52) U.S. Cl.
CPC ............ *H04W 48/16* (2013.01); *H04W 48/18* (2013.01)

(58) Field of Classification Search
USPC .................................. 370/252, 328, 329, 330
See application file for complete search history.

(56) References Cited

U.S. PATENT DOCUMENTS

| | | | |
|---|---|---|---|
| 2006/0160538 A1* | 7/2006 | Hwang | H04W 48/18 455/435.2 |
| 2008/0281979 A1* | 11/2008 | Keeler | H04L 47/2475 709/233 |
| 2009/0258645 A1 | 10/2009 | Ramkull et al. | |
| 2011/0014913 A1* | 1/2011 | Yoon | H04W 48/20 455/435.3 |
| 2012/0135733 A1 | 5/2012 | Cormier et al. | |
| 2015/0087301 A1* | 3/2015 | Choudhary | H04W 64/00 455/434 |
| 2015/0119029 A1* | 4/2015 | Scribano | H04W 48/18 455/434 |
| 2015/0244400 A1* | 8/2015 | Mueck | H04B 1/0057 455/77 |

(Continued)

FOREIGN PATENT DOCUMENTS

WO  WO 2014/024006 A1  2/2014
WO  WO 2014/084475 A1  6/2014

*Primary Examiner* — Kwang B Yao
*Assistant Examiner* — Nguyen Ngo
(74) *Attorney, Agent, or Firm* — Birch, Stewart, Kolasch & Birch, LLP

(57) ABSTRACT

A method of controlling a mobile terminal, and which includes receiving, via a wireless communication unit, a wireless signal from an external wireless access point (AP); configuring, via a controller, a frequency band for searching a frequency transmitted from a mobile communication network based on information contained in the wireless signal; and searching a frequency transmitted from the mobile communication network on the configured frequency band. Further, the configured frequency band is a partial search frequency band of a full search frequency band.

14 Claims, 6 Drawing Sheets

(56) References Cited

U.S. PATENT DOCUMENTS

| | | | |
|---|---|---|---|
| 2015/0257114 A1* | 9/2015 | Sawada | H04W 52/0241 370/350 |
| 2015/0264640 A1* | 9/2015 | Feng | H04W 8/183 455/558 |
| 2015/0296496 A1 | 10/2015 | Cho et al. | |
| 2015/0341846 A1* | 11/2015 | Shi | H04W 48/16 455/434 |
| 2016/0054427 A1* | 2/2016 | Wirola | G01S 5/0236 342/451 |
| 2016/0073417 A1* | 3/2016 | Sebeni | H04W 48/16 370/329 |

* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0013009, filed on Jan. 27, 2015, the contents of which is incorporated by reference herein in its entirety.

BACKGROUND OF THE INVENTION

1. Field of the Invention

The present disclosure relates to a mobile terminal capable of accessing a mobile communication network and a control method thereof, and more particularly, to a mobile terminal capable of searching a frequency of a mobile communication network to access the mobile communication network and a control method thereof.

2. Description of the Related Art

Terminals may be generally classified into mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can capture still images or moving images, play music or video files, play games, receive broadcast and the like, so as to be implemented as an integrated multimedia player. In recent years, as mobile communication technologies have been developed, mobile communication providers offer services on second generation mobile communication technologies (2G), third generation mobile communication technologies (3G), fourth generation mobile communication technologies (4G), and the like.

For example, the second through the fourth generation mobile communication technologies include a mobile communication standard or radio access technology (RAT), for example, at least one of Global System for Mobile communication (GSM), Code Division Multi Access (CDMA), Wideband CDMA (WCDMA), Universal Mobile Telecommunication System (UMTS), Long Term Evolution (LTE), Long Term Evolution-Advanced (LTE-A), and the like.

The mobile terminal can access a mobile communication network (or network) established according to the foregoing mobile communication technologies to perform wireless communication. Such a mobile communication network may have a specific RAT and a frequency band for each mobile communication technology. Further, as different mobile communication technologies are serviced for each region/country, the RATs and frequency bands for accessing a mobile communication network in each region/country may be different.

Accordingly, in the related art, when a mobile terminal moves to regions/countries providing different mobile communication networks, the mobile terminal searches all RATs and all frequencies for each RAT to access a mobile communication network provided from the relevant region/country, thereby lengthening a time for accessing the mobile communication network as well as increasing battery consumption of the mobile terminal.

SUMMARY OF THE INVENTION

An aspect of the present disclosure is to provide a mobile terminal and a control method thereof capable of minimizing a time for accessing a mobile communication network.

Another aspect of the present disclosure is to provide a mobile terminal and a control method thereof capable of configuring a frequency search range for accessing a mobile communication network based on information received from a wireless access point (AP).

In order to accomplish the foregoing objectives, a control method of a mobile terminal according to an embodiment of the present disclosure may include receiving a wireless signal from an external wireless access point (AP), configuring a frequency band for searching a frequency transmitted from a mobile communication network based on information contained in the wireless signal, and searching a frequency transmitted from the mobile communication network on the configured frequency band.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. It will be understood that, although the terms first, second, etc. may be used herein to describe various elements, these elements should not be limited by these terms. These terms are only used to distinguish one element from another.

When an element is referred to as being "connected with" another element, the element can be directly connected with the other element or intervening elements may also be present. In contrast, when an element is referred to as being "directly connected with" another element, there are no intervening elements present. A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, the configuration according to the exemplary embodiments of this specification can also be applied to stationary terminals such as a digital TV, a desktop computer, a digital signage and the like, excluding a case of being applicable only to the mobile terminals.

Figure 1:
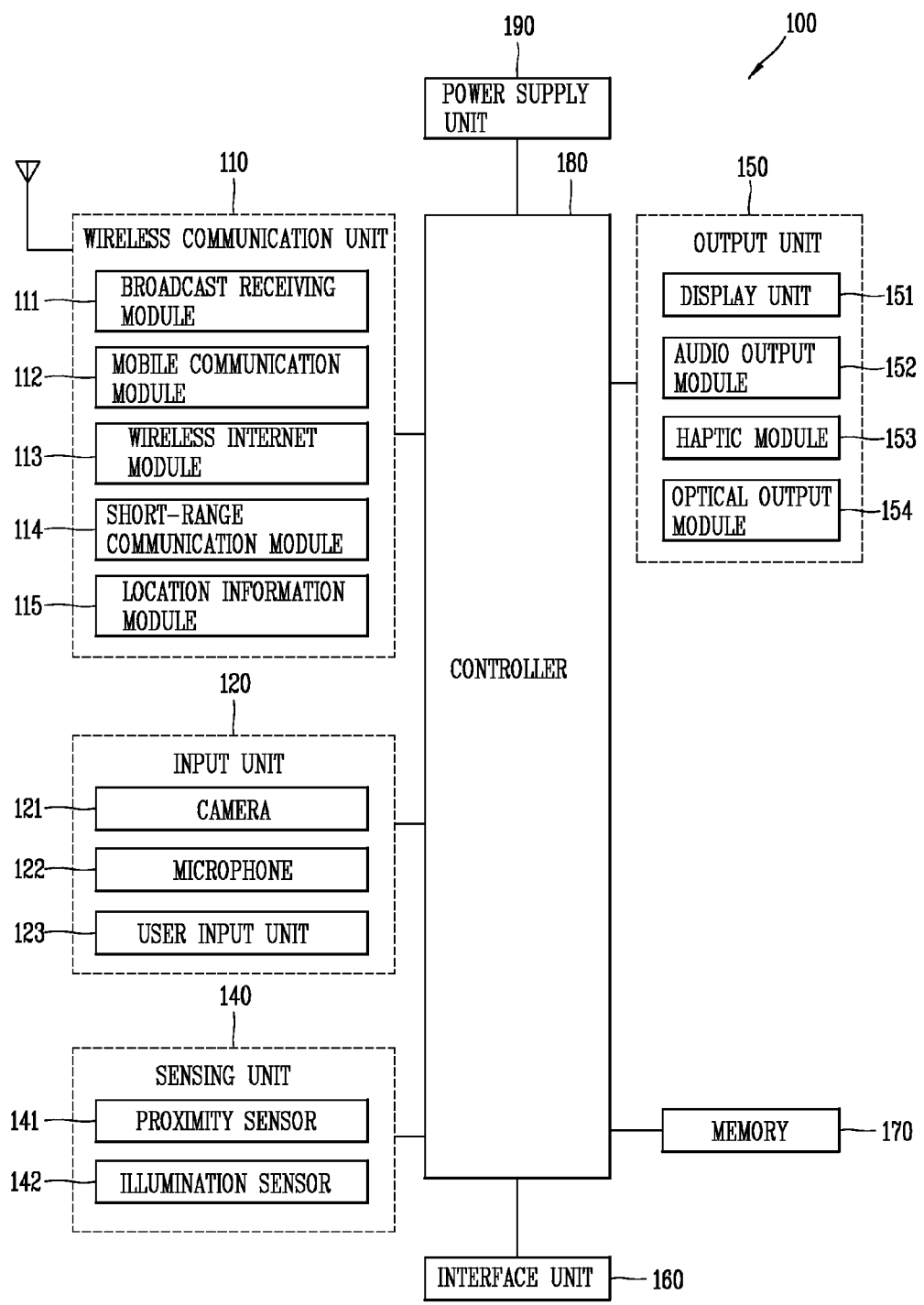
FIG. 1 is a block diagram illustrating a mobile terminal associated with the present disclosure.

Referring to FIG. 1, FIG. 1 is a block diagram illustrating explaining a mobile terminal associated with the present disclosure. The mobile terminal 100 may include components, such as a wireless communication unit 110, an input unit 120, a sensing unit 140, an output unit 150, an interface unit 160, a memory 170, a controller 180, a power supply unit 190 and the like. FIG. 1 illustrates the mobile terminal having various components, but it may be understood that implementing all of the illustrated components is not a requirement. Greater or fewer components may alternatively be implemented.

In more detail, the wireless communication unit 110 typically includes one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located. For example, the wireless communication unit 110 includes at least one of a broadcast receiving module 111, a mobile communication module 112, a wireless Internet module 113, a short-range communication module 114, a location information module 115 and the like.

The input unit 120 includes a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 includes at least one sensor which senses at least one of internal information of the mobile terminal, a surrounding environment of the mobile terminal and user information. For example, the sensing unit 140 includes a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 can output an audio signal, a video signal or a tactile signal. The output unit 150 includes a display unit 151, an audio output module 152, a haptic module 153, an optical output module 154 and the like. The display unit 151 may have an inter-layered structure or an integrated structure with a touch sensor so as to implement a touch screen. The touch screen can provide an output interface between the mobile terminal 100 and a user, as well as functioning as the user input unit 123 which provides an input interface between the mobile terminal 100 and the user.

The interface unit 160 serves as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 can store data for supporting various functions of the mobile terminal 100. The memory 170 can store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

The controller 180 typically controls at least part of the components illustrated in FIG. 1, in order to drive the application programs stored in the memory 170. In addition, the controller 180 can drive the application programs by combining at least two of the components included in the mobile terminal 100 for operation.

The power supply unit 190 can receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1, prior to explaining various exemplary embodiments implemented by the mobile terminal 100 having the configuration. First, the wireless communication unit 110 will be described. The broadcast receiving module 111 of the wireless communication unit 110 can receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 can transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), Long Term Evolution-Advanced (LTE-A), etc.)

The wireless signals may include audio call signal, video (telephony) call signal, or various formats of data according to transmission/reception of text/multimedia messages. The wireless Internet module 113 denotes a module for wireless Internet access. This module can be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A) and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which can exchange data with the mobile terminal 100 (or to cooperate with the mobile terminal 100). The short-range communication module 114 may sense (recognize) a wearable device, which can communicate with the mobile terminal), near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, may not be necessarily limited to a module for directly calculating or acquiring the location of the mobile terminal.

Next, the input unit 120 can provide an audio or video signal (or information) input to the mobile terminal or information input by a user to the mobile terminal. For the input of the audio information, the mobile terminal 100 may include one or a plurality of cameras 121. The camera 121 can process image frames of still pictures or video obtained by image sensors in a video call mode or a capture mode. The processed image frames can be displayed on the display unit 151. Further, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 can process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 can receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

The sensing unit 140 can sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like. As one example, the touch sensor can convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program. Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 can output information processed in the mobile terminal 100. For example, the display unit 151 can display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images. The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 can output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 can generate various tactile effects the that user may feel. A typical example of the tactile effect generated by the haptic module 153 may be vibration. Strength, pattern and the like of the vibration generated by the haptic module 153 can be controllable by a user selection or setting of the controller. For example, the haptic module 153 can output different vibrations in a combining manner or a sequential manner.

Besides vibration, the haptic module 153 can generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like. A signal output by the optical output module 154 may be implemented so the mobile terminal emits monochromatic light or light with a plurality of colors. The signal output may be terminated as the mobile terminal senses a user's event checking.

The interface unit 160 serves as an interface with external devices connected with the mobile terminal 100. For example, the interface unit 160 can receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 typically controld the general operations of the mobile terminal 100. For example, the controller 180 can set or release a lock state for restricting a user from inputting a control command with respect to applications when a status of the mobile terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the mobile terminal 100.

The power supply unit 190 receives external power or internal power and supplies appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable or its similar medium using, for example, software, hardware, or any combination thereof.

Hereinafter, a communication system which is operable with the mobile terminal 100 according to the present disclosure will be described. First, such communication system utilizes different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (especially, Long Term Evolution (LTE)), Global System for Mobile Communications (GSM), and the like.

By way of non-limiting example only, further description will relate to a CDMA communication system, but such teachings apply equally to other system types including a CDMA wireless communication system. A CDMA wireless communication system includes one or more mobile terminals 100, one or more base stations (BSs), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites. A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100 may cooperate with the CDMA wireless communication system. Such satellites 300 facilitate locating the position of the mobile terminal 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

A location information module 115 of the mobile terminal is configured to acquire a position of the mobile terminal. Such location information module 115 may include a Global Position System (GPS) module and a Wireless Fidelity (Wi-Fi) module. According to the needs, the location information module 115 may perform any function of another module of the wireless communication unit 110 to obtain data for the location of the mobile terminal in an additional or alternative manner.

The GPS module 115 may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position. It is difficult to precisely measure a position of the mobile terminal using the GPS module, in a blind spot of satellite signals such as an indoor space. In order to compensate for the positioning technique using such GPS module, a Wi-Fi Positioning System (WPS) may be utilized.

The Wi-Fi positioning system (WPS) refers to a location determination technology based on a wireless local area network (WLAN) using Wi-Fi as a technology for tracking the location of the mobile terminal 100 using a Wi-Fi module provided in the mobile terminal 100 and a wireless access point for transmitting and receiving to and from the Wi-Fi module. The Wi-Fi positioning system may include a Wi-Fi location determination server, a mobile terminal 100, a wireless access point (AP) connected to the mobile terminal, and a database stored with any wireless AP information.

The mobile terminal 100 connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may be at least one of MAC address, SSID, RSSI, channel information, privacy, network type, signal strength and noise strength. The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, etc.

The Cell-ID method is used to determine a position of a wireless AP having the largest signal strength, among peripheral wireless AP information collected by a mobile terminal, as a position of the mobile terminal. The Cell-ID method is advantageous in that an implementation is simple, additional costs are not required, and location information can be rapidly acquired. However, the Cell-ID method is disadvantageous in that precision of positioning is lowered when an installation density of a wireless AP is low.

The fingerprint method is used to collect signal strength information by selecting a reference position from a service area, and to track a position of a mobile terminal using the signal strength information transmitted from the mobile terminal based on the collected information. In order to use the fingerprint method, characteristics of radio signals should be pre-stored in the form of database.

The trigonometry method is used to calculate a position of a mobile terminal, based on a distance between coordinates of at least three wireless APs and the mobile terminal. In order to measure the distance between the mobile terminal and the wireless AP, signal strength may be converted into distance information, or Time of Arrival (ToA) taken for wireless signals to be transmitted may be used.

The landmark method is used to measure a position of a mobile terminal using a known landmark transmitter. Besides the above methods, various algorithms may be used to extract (analyze) location information of a mobile terminal. Such extracted location information of the mobile terminal 100 is transmitted to the mobile terminal 100 through the Wi-Fi location determination server, thereby acquiring location information of the mobile terminal 100.

The mobile terminal 100 may acquire location information by being connected to at least one wireless AP. The number of wireless APs required to acquire location information of the mobile terminal 100 may be variously changed according to a wireless communication environment where the mobile terminal 100 is positioned.

Hereinafter, preferred embodiments related to a control method which can be implemented in the mobile terminal will be explained in more detail with reference to the attached drawings. It is obvious to those skilled in the art that the present features can be embodied in several forms without departing from the characteristics thereof.

A mobile terminal including at least one of the foregoing constituent elements according to an embodiment of the present disclosure can access a mobile communication network (or network) established depending on technical standards or communication schemes for mobile communications to perform mobile communication. The technical standards or communication schemes for mobile communications may include Mobile Communication (GSM), Code Division Multi Access (CDMA), CDMA2000 (Code Division Multi Access 2000), Universal Mobile Telecommunications System (UMTS), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like, for example.

The technical standards or communication schemes may be classified based on second generation mobile communication technologies (2G), third generation mobile communication technologies (3G), and fourth generation mobile communication technologies (4G). Furthermore, mobile communication networks established by the second generation mobile communication technologies (2G), third generation mobile communication technologies (3G), and fourth generation mobile communication technologies (4G) may be referred to as a 2G mobile communication network, a 3G mobile communication network, and a 4G mobile communication network, respectively.

Furthermore, for the sake of convenience of explanation, it is described herein that Long Term Evolution (LTE) among the technical standards or communication schemes for mobile communications is included in the fourth generation mobile communication technologies. In addition, a mobile communication technology included in each generation may be referred to as a radio access technology (RAT). For example, in order to access a mobile communication network established by a specific radio access technology (RAT), the mobile terminal 100 may search a frequency band corresponding to the specific RAT to access the mobile communication network.

Further, each region/country over the world provides mobile communication networks using different mobile communication technologies. Furthermore, even when a mobile communication network established by the same mobile communication technology is provided, each region/country may have a different frequency band.

When a mobile communication network is not accessed (hereinafter, referred to as a "no-service state"), the mobile terminal 100 can search a frequency to access the mobile communication network according to a user's request or under the control of the controller. In other words, the mobile terminal 100 can search all frequency bands for each of the RAT technologies provided in the mobile terminal to search a frequency transmitted from the mobile communication network.

Further, according to an embodiment of the present disclosure, a range for searching a frequency transmitted from a mobile communication network can include a specific frequency band included in a specific RAT other than a full band for all the RATs. Then, the mobile terminal 100 can search a frequency on a specific frequency band corresponding to the specific RAT to access a mobile communication network.

Figure 2:
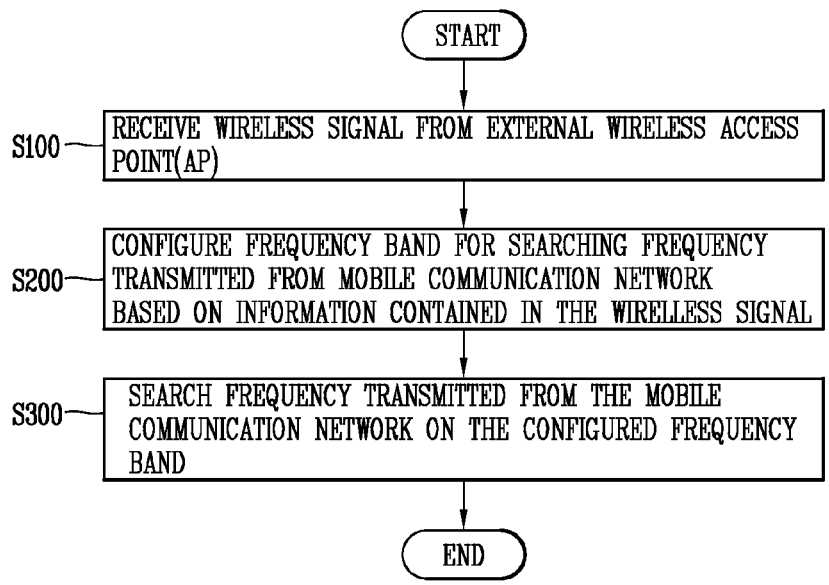
FIG. 2 is a flow chart illustrating a control method according to an embodiment of the present disclosure.
Figure 3:
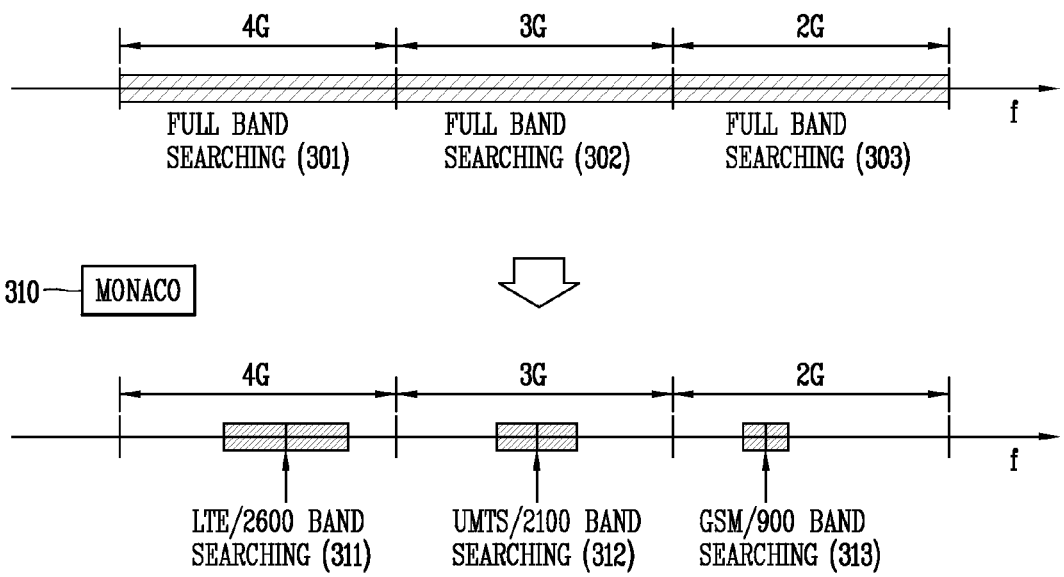
FIG. 3 is a conceptual view illustrating the control method illustrated in FIG. 2.

Hereinafter, a method of allowing a mobile terminal to configure a specific frequency band included in a specific RAT in a no-service state will be described in more detail with reference to the accompanying drawings. In particular, FIG. 2 is a flow chart illustrating a control method of the present disclosure, and FIG. 3 is a conceptual view illustrating the control method illustrated in FIG. 2.

In a mobile terminal according to an embodiment of the present disclosure, the process of receiving a wireless signal from an external wireless access point (AP) is performed (S100). Specifically, the controller 180 can receive a wireless signal transmitted from an external wireless access point through the wireless communication unit 110. Here, the wireless communication unit 110 may be in an active state for receiving a wireless signal.

The external wireless access point (AP) performs the role of relaying wireless devices to any mobile communication network so that the wireless devices such as a mobile terminal can access a mobile communication network, and perform a repeater role of connecting the wireless devices to the mobile communication network using Wireless Fidelity (Wi-Fi) or Bluetooth™ related standards. The external wireless APs are located at a place separated from the mobile terminal (or body), and as described above, allows the mobile terminal to access any mobile communication network desired to be accessed. Here, the mobile terminal is first required to access a wireless AP, and wireless signals are transmitted or received between the mobile terminal and the wireless AP for the access.

In other words, the wireless communication unit 110 included in the mobile terminal can transmit and receive wireless signals to and from the wireless APs located in the vicinity of its current location. Furthermore, when there exists a wireless AP in the vicinity even though it is not the case that the mobile terminal has to access a specific network using the wireless AP, the mobile terminal may automatically transmit or receive wireless signals to or from the wireless AP in the vicinity.

Furthermore, in order to transmit a wireless signal from the wireless AP to the mobile terminal, the mobile terminal is located within a predetermined distance from the wireless AP. Here, the predetermined distance may vary according to the characteristics of the wireless AP. In other words, the wireless AP may have a range configured to transmit and receive wireless signals, namely, a wireless local area network range (hereinafter, referred to as a "wireless AP range"). When located within a wireless AP range, the mobile terminal can transmit and receive wireless signals to and from the wireless AP.

Furthermore, as a distance between the wireless AP and the mobile terminal decreases, the signal intensity of a wireless signal may be strong and the speed of transmitting a wireless signal from the wireless AP to the mobile terminal may be also high. In other words, as the intensity of a wireless signal received from the mobile terminal increases, it may be estimated that the wireless AP that has transmitted the wireless signal to the mobile terminal is located closer to the mobile terminal.

The wireless AP as described above, for example, may be implemented by a Wi-Fi technology based on any one (for example, IEEE 802.11b) among the IEEE (Institute of Electrical and Electronics Engineers) 802.11 related standards. Further, the wireless AP can periodically generate a wireless signal. Here, the periodically generated wireless signal may be a beacon frame, for example.

The beacon frame may be defined as a management frame provided from IEEE 802.11-based wireless local area networks. The wireless AP can periodically generate a beacon frame to notify its own existence (to notify the existence of a wireless local area network). Here, the beacon frame may include the above-mentioned information of the wireless AP.

Specifically, the beacon frame may include various information associated with a network (wireless AP). Information contained in the beacon frame (information of the wireless AP) may be information such as a Basic Service Set IDentification (BSSID), a Mobile Country Code (MCC), a MAC Address, a SSID, channel information, privacy, a network type, a latitude/longitude coordinate of the wireless AP, a building name located with the wireless AP, a floor number, specific indoor location information (GPS coordinates available), an address of AP owner, a phone number, and the like.

Here, as an identifier for identifying a basic service set, the BSSID may be a MAC address of the wireless AP. In other words, the BSSID may be understood as an identifier performing the same/similar role as that of the MAC address. In a no-service state, the controller 180 can activate the short-range communication module 114 (for example, Wi-Fi module) of the wireless communication unit 110 according to a user's request or under the control of the controller, and receive a wireless signal (beacon frame) periodically generated from the wireless AP.

Then, in a mobile terminal according to an embodiment of the present disclosure, the process of configuring a frequency band for searching a frequency transmitted from a mobile communication network based on information contained in the wireless signal is performed (S200). First, the wireless signal (beacon frame) received from the wireless AP may include information such as Table 1, for example. Here, it may be understood that the information contained in the wireless signal has the meaning of information contained in a beacon frame.

TABLE 1

Frame 4106: 179 bytes on wire (143 bits), 179 bytes captured (1432 bits)
Radiotap Header v0, Length 26
IEEE 802.11 Beacon frame, Flags: . . . C
Type/Subtype: Beacon frame (0x08)
Frame Control Field: 0x8000
.000 0000 0000 0000 = Duration: 0 microseconds
Receiver address: Broadcast (ff:ff:ff:ff:ff:ff)
Destination address: Broadcast (ff:ff:ff:ff:ff:ff)
Transmitter address: Cisco__d6:71:2b (00:1c:0e:d6:71:2b)
Source address: Cisco__d6:71:2b (00:1c:0e:d6:71:2b)
BSS Id: Cisco d6:71:2b (00:1c:0e:d6:71:2b)
Fragment number: 0
Sequence number: 2598
Frame check sequence: 0xe5509b2d [correct]
IEEE 802.11 wireless LAN management frame
Fixed parameters (12 bytes)
Tagged parameters (113 bytes)
Tag: SSID parameter set: uLGE REG
Tag: Supported Rates 5.5(B), 6, 9, 11(B), 12, 18, 24, 36, [Mbit/sec]
Tag: DS parameter set: Current Channel: 11
Tag: Traffic Indication Map (TIM): DTIM 0 of 0 bitmap
Tag: Country Information: Country Code KR, Environment Any
Tag: ERP Information
Tag: Extended Supported Rates 48, 54, [Mbit/sec]
Tag: Cisco CCX1 CKIP + Device Name As described above in Table 1, the information contained in the wireless signal may include a BSSID, a SSID, channel information, a Mobile Country Code (MCC) or the like. The controller 180 can use at least one of the information contained in the wireless signal to configure a frequency band for searching a frequency transmitted from a mobile communication network. Specifically, the controller 180 can extract at least one of a BSSID and an MCC among the information contained in the wireless signal.

Then, the controller 180 can configure a frequency band based on at least one of the BSSID and MCC extracted from the information contained in the wireless signal. Specifically, the controller 180 can configure a frequency band based on at least one of information associated with the BSSID and information associated with the MCC stored in the memory 170.

Mobile communication network frequency information linked to each MCC can be stored in the memory 170. Here, the mobile communication network frequency information linked to each MCC may be named an MCC-mobile communication network frequency information table (or list). The mobile communication network frequency information linked to each MCC may include radio access technology (RAT) and reference frequency information of a mobile communication network provided in each region/country (each MCC). For example, the mobile communication network frequency information linked to each MCC (MCC-mobile communication network frequency information table) may be shown as Table 2.

TABLE 2

| Country name | MCC | 2G | 3G | 4G |
|---|---|---|---|---|
| Albania | 276 | GSM 900/GSM 1800 | UMTS 2100 | |
| Belgium | 206 | GSM 900/GSM 1800 | UMTS 900/ UMTS 2100 | LTE 1800 |
| Monaco | 212 | GSM 900 | UMTS 2100 | LTE 2600 |
| . . . | . . . | . . . | . . . | . . . |

Only MCC information for some countries and mobile communication network frequency information linked thereto among the countries and regions over the world are disclosed for an illustration in Table 2. In other words, as illustrated in Table 2, MCC information for countries and regions over the world and mobile communication network frequency information linked to each MCC can be stored in the memory 170.

Referring to FIG. 2, an MCC for identifying regions/countries is linked to mobile communication network frequency information provided for the relevant region/country in the MCC-mobile communication network frequency information table. Here, mobile communication network frequency information may include the mobile communication technology of a mobile communication network (or radio access technology (RAT) for accessing a mobile communication network) information (for example, GSM, UMTS, LTE, etc.), and reference frequency information (for example, 900, 1800, 2100, 2600, etc.). Here, the unit of reference frequency information may be MHz.

The controller 180 can extract an MCC from information contained in a wireless signal received from a wireless AP, and detect mobile communication network frequency information linked to the extracted MCC using mobile communication network frequency information (MCC-mobile communication network frequency information table) linked to each MCC previously stored in the memory 170. For example, when the MCC extracted from information contained in a wireless signal (beacon frame) is 212 (for an MCC corresponding to Monaco) (310), the controller 180 can detect mobile communication network frequency information (for example, GSM 900, UMTS 2100, LTE 2600) using an MCC-mobile communication network frequency information table stored in the memory 170.

Further, MCC information linked to each BSSID can be stored in the memory 170. Here, the MCC information linked to each BSSID may be referred to as a BSSID-MCC table (or list). For example, the MCC information linked to each BSSID (BSSID-MCC table) may be shown as Table 3.

TABLE 3

| BSSID | MCC |
|---|---|
| 00:1c:0e:d6:71:2b | 450 |
| 00:1b:2f:a8:e5:21 | 212 |
| . . . | . . . |

In other words, BSSID (or MAC address) information of at least one wireless AP and MCC information linked to each BSSID may be stored in the memory 170 as illustrated in FIG. 3. The controller 180 can extract a BSSID among information contained in a wireless signal received from the wireless AP, and then extract an MCC based on the BSSID-MCC table. Then, the controller 180 can detect mobile communication network frequency information linked to the extracted MCC using an MCC-mobile communication network frequency information table stored in the memory 170 based on the extracted MCC. In other words, the controller 180 can configure a frequency band for each RAT based on the detected mobile communication network frequency information.

Here, the controller 180 can configure a frequency band to have a predetermined size of bandwidth with respect to a reference frequency corresponding to reference frequency information based on radio access technology information contained in the mobile communication network frequency information. For example, when the mobile communication network frequency information is UMTS 2100 MHz, the controller 180 can configure a frequency band from which a frequency is searched using a UMTS radio access technology. Here, the frequency band may be formed to have a bandwidth having a predetermined size with respect to the reference frequency (2100 MHz).

Specifically, information on a downlink bandwidth and an uplink bandwidth may be linked to the mobile communication network frequency information, respectively. The downlink bandwidth and uplink bandwidth may have a predetermined interval with respect to the reference frequency. Here, the downlink bandwidth and uplink bandwidth, respectively, can denote an interval between a low frequency and a high frequency, and be referred to as bandwidth (MHz). Furthermore, an interval between a low frequency of the downlink bandwidth and a low frequency of the uplink bandwidth or a high frequency of the downlink bandwidth and a high frequency of the uplink bandwidth can be referred to as a duplex spacing (MHz).

For example, when the mobile communication network frequency information is UMTS 2100 (or referred to as B1(2100)), the B1(2100) can include reference frequency information (2100 MHz), downlink bandwidth information (2110-2170 MHz), and uplink bandwidth information (1920-1980 MHz). In this instance, the bandwidth of B1(2100) is 60 MHz, and the duplex spacing is 190 MHz.

The controller 180 can configure a frequency band for searching a frequency based on radio access technology information and reference frequency information contained in the detected mobile communication network frequency information. Specifically, the controller 180 can configure a frequency band to have a predetermined size of bandwidth based on a reference frequency corresponding to reference frequency information contained in the detected mobile communication network frequency information.

Here, the predetermined size of bandwidth may be a bandwidth including a downlink bandwidth and an uplink bandwidth contained in the detected mobile communication network frequency information. For example, the bandwidth may have a size of 250 MHz which is a sum of the duplex spacing and the bandwidth. The predetermined size of bandwidth may vary according to the radio access technology information and the reference frequency information. For example, when the mobile communication network frequency information is LTE 1900 (or B2(1900)) other than UMTS 2100, the B2(1900) can include reference frequency information (1900 MHz), downlink bandwidth information (1930-1990 MHz), and uplink bandwidth information (1850-1910 MHz). In this instance, the bandwidth of the B2 (1900) is 60 MHz, and the duplex spacing is 80 MHz.

In this instance, the predetermined size of bandwidth may be a bandwidth including a downlink bandwidth and an uplink bandwidth contained in the detected mobile communication network frequency information (LTE 1900). For example, the bandwidth may have a size of 140 MHz which is a sum of the duplex spacing and the bandwidth. In other words, the controller 180 can configure a frequency band to have a different size of bandwidth according to the radio access technology information and the reference frequency information (or referred to as a frequency band).

Then, in the mobile terminal according to an embodiment of the present disclosure, the process of searching a frequency transmitted from a mobile communication network is performed (S300). Specifically, the controller 180 can perform frequency search only on the configured frequency band without performing frequency search on a full band for each RAT provided in the mobile terminal.

When a frequency transmitted from a mobile communication network is searched as a result of performing frequency search on the frequency band, the controller 180 can access the mobile communication network that has transmitted the searched frequency. Further, when a frequency transmitted from a mobile communication network is unable to be searched subsequent to performing frequency search on the configured frequency band, the controller 180 can perform frequency search on a preset default frequency band, for example.

The above-mentioned description will be more clearly understood with reference to FIG. 3. When a mobile communication network is not accessed (no-service state), the controller 180 can perform frequency search based on a user request. Here, in the related art, as illustrated in the first drawing of FIG. 3, a frequency is searched on a full frequency band (referred to as a "full band") 301, 302, 303 for each RAT provided in the mobile terminal to access a mobile communication network established according to mobile communication technologies (for example, 4G, 3G, 2G). Accordingly, in the related art, a frequency band search time for accessing a mobile communication network takes a long time and the battery consumption is high.

On the contrary, a mobile terminal according to an embodiment of the present disclosure extracts an MCC from information contained in a wireless signal received from an external wireless AP, and configures a frequency band 311, 312, 313 associated with a mobile communication network provided from a region/country in which the mobile terminal is located, other than a full band, based on an MCC-mobile communication network frequency information table pre-stored therein.

For example, the controller 180 can extract an MCC from information contained in a wireless signal (beacon frame) from a wireless AP. Here, when the MCC is "212" corresponding to Monaco (310), the controller 180 can detect mobile communication network frequency information linked to the MCC which is "212" from an MCC-mobile communication network frequency information table stored in the memory 170.

Here, the controller 180 can configure a frequency band for searching a frequency transmitted from a mobile communication network based on the detected mobile communication network frequency information. At this time, when there are a plurality of the detected mobile communication network frequency information, the controller 180 can configure a plurality of frequency bands based on the plurality of mobile communication network frequency information. For example, when the detected mobile communication network frequency information is GSM 900, UMTS 2100 and LTE 2600, the controller 180 can configure a first frequency band 311 (LTE/2600 BAND) for searching a frequency with a RAT corresponding to LTE, a second frequency band 312 (UMTS/2100 BAND) for searching a frequency with a RAT corresponding to UMTS, and a third frequency band 313 (GSM/900 BAND) for searching a frequency with a RAT corresponding to GSM.

The first through the third frequency band can have different sizes of bandwidths according to the RAT and reference frequency information. For example, the first frequency band 311 can be formed to include a downlink bandwidth and an uplink bandwidth linked to LTE 2600 with respect to 2600 MHz, and the second frequency band 312 can be formed to include a downlink bandwidth and an uplink bandwidth linked to UMTS2100 with respect to 2600 MHz. It is also applicable to the third frequency band 313.

In other words, the first through the third bandwidth can have different sizes according to the downlink bandwidth and uplink bandwidth linked to each mobile communication network frequency information (LTE 2600, UMTS 2100, GSM 900, etc.) However, the present disclosure is not limited to this, and a bandwidth of the frequency band (a bandwidth having a predetermined size) can be configured by the user's setting.

When the frequency band 311, 312, 313 is configured, the controller 180 can search a frequency transmitted from a mobile communication network on the configured frequency band 311, 312, 313 instead of performing frequency search on a full band 301, 302, 303. Here, the controller 180 can determine a frequency band search sequence based on the radio access technology information.

For example, when a plurality of frequency bands are configured, the controller 180 can determine a frequency band search sequence based on radio access technology information (for example, LTE, UMTS, GSM) as illustrated in the second drawing of FIG. 3. For example, the frequency band search sequence can perform frequency search in the order of radio access technologies corresponding to higher generation mobile communication technologies, and in this instance, the frequency band search sequence may be in the order of LTE/2600 band, UMTS/2100 band, and GSM/900 band.

If a frequency transmitted from a mobile communication network is searched from the LTE/2600 band, and the mobile communication network is accessed, then the controller 180 can suspend the search. Through such a configuration, according to an embodiment of the present disclosure, only a specific frequency band corresponding to a mobile communication network serviced for each region/country can be configured, and only the specific frequency band may be searched, thereby solving problems in the related art in which the time takes long and the battery consumption is high since all frequency bands should be searched for each of the RATs provided in the mobile terminal.

Figure 4:
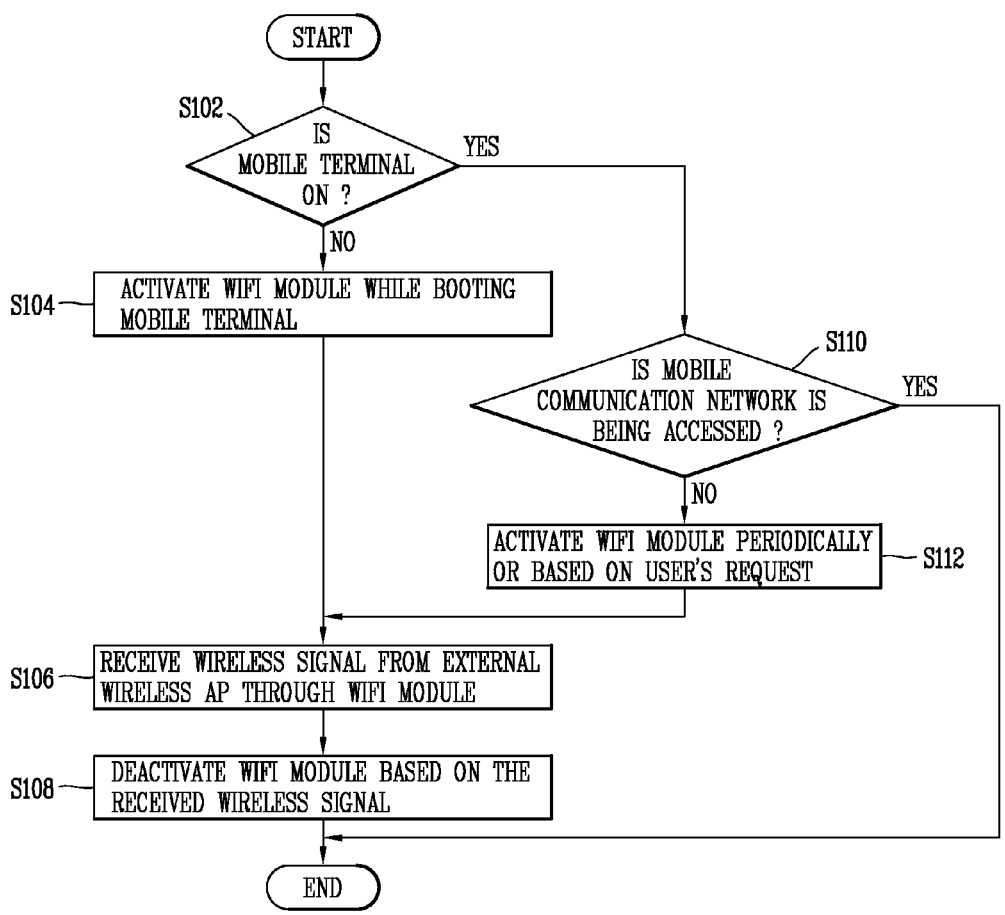
FIG. 4 is a flow chart illustrating a method of controlling a wireless communication unit to receive a wireless signal according to an embodiment of the present disclosure.

Hereinafter, a method of controlling a mobile terminal to receive a wireless signal from an external wireless AP will be described in more detail with reference to FIG. 4. In particular, FIG. 4 is a flow chart illustrating a method of controlling a wireless communication unit to receive a wireless signal according to an embodiment of the present disclosure.

First, the controller 180 determines whether the mobile terminal is in an ON state (S102). The ON state of the mobile terminal denotes a state in which functions available on the mobile terminal can be executed based on an operating system mounted on the mobile terminal. When the mobile terminal is booted based on a user request when the mobile terminal is not in an ON state, the controller 180 can activate the short-range communication module 114 (for example, Wi-Fi module) of the wireless communication unit 110 during the booting of the mobile terminal (S104).

Then, the controller 180 can receive a wireless signal from an external wireless AP through the Wi-Fi module (S106). The external wireless AP periodically generates a wireless signal, and the wireless signal can be a beacon frame. When the wireless signal is received, the controller 180 can switch the short-range communication module 114 (for example, Wi-Fi module) from an active state to an inactive state (S108). Through such a configuration, the present disclosure can save battery consumption while maintaining the Wi-Fi module in an active state.

In another example, even though the wireless signal is received, the controller 180 can switch the activated Wi-Fi module to an inactive state after the passage of a predetermined time or maintain the Wi-Fi module in an active state until receiving a user request. Through such a configuration, the present disclosure can receive a different type of wireless signal from a different external wireless AP. In still another example, when a wireless signal cannot be received prior to completing the booting of the mobile terminal, the controller 180 can switch the activated Wi-Fi module to an inactive state based on the booting of the mobile terminal. Further, the controller 180 can determine whether or not a mobile communication network is being accessed when the mobile terminal is in an ON state (S110). When the mobile communication network is being accessed, frequency search for accessing the mobile communication network may not be required.

However, when the mobile communication network is not being accessed, the controller 180 can activate the Wi-Fi module according to a user request or in a periodic manner (S112). Then, when a wireless signal is received through the activated Wi-Fi module (S106), the controller 180 can switch the activated Wi-Fi module to an inactive state based on the received wireless signal (S108). Similarly to the foregoing description, even though a wireless signal is received, the controller 180 can switch the activated Wi-Fi module to an inactive state after the passage of a predetermined time or maintain the Wi-Fi module in an active state prior to receiving a user request.

Figure 5:
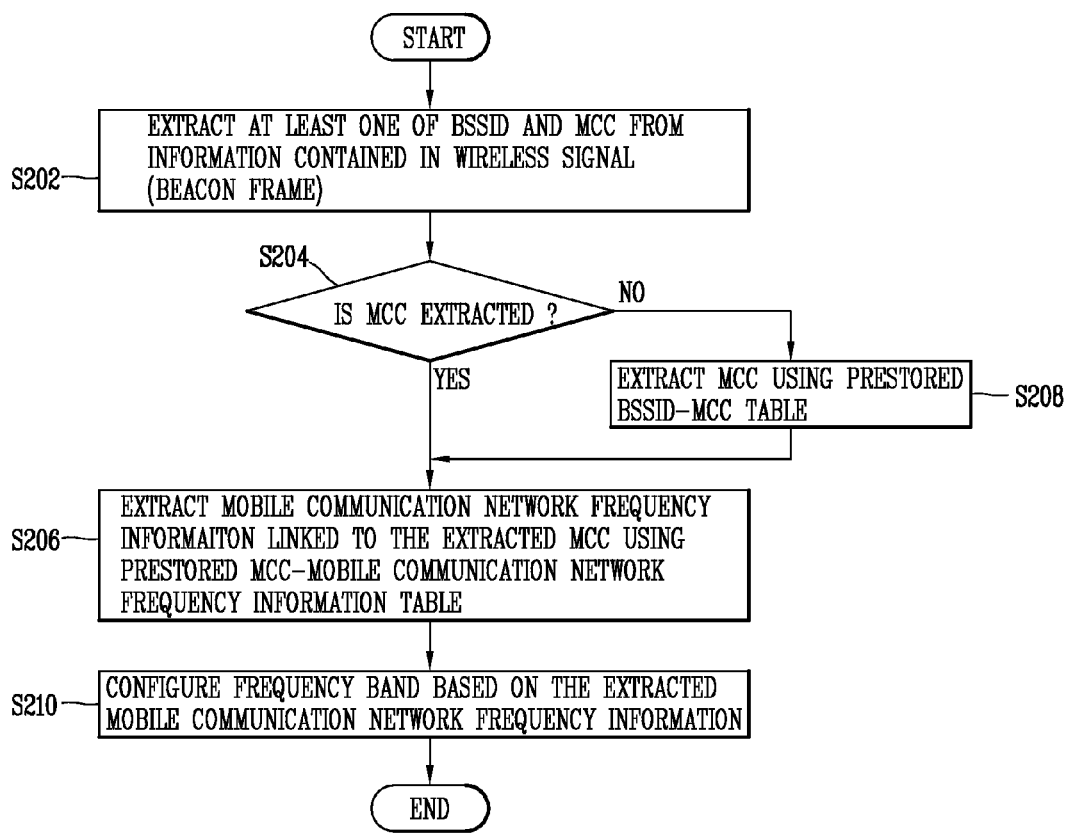
FIG. 5 is a flow chart illustrating a method of configuring a frequency band using information contained in a wireless signal according to an embodiment of the present disclosure.
Figure 6:
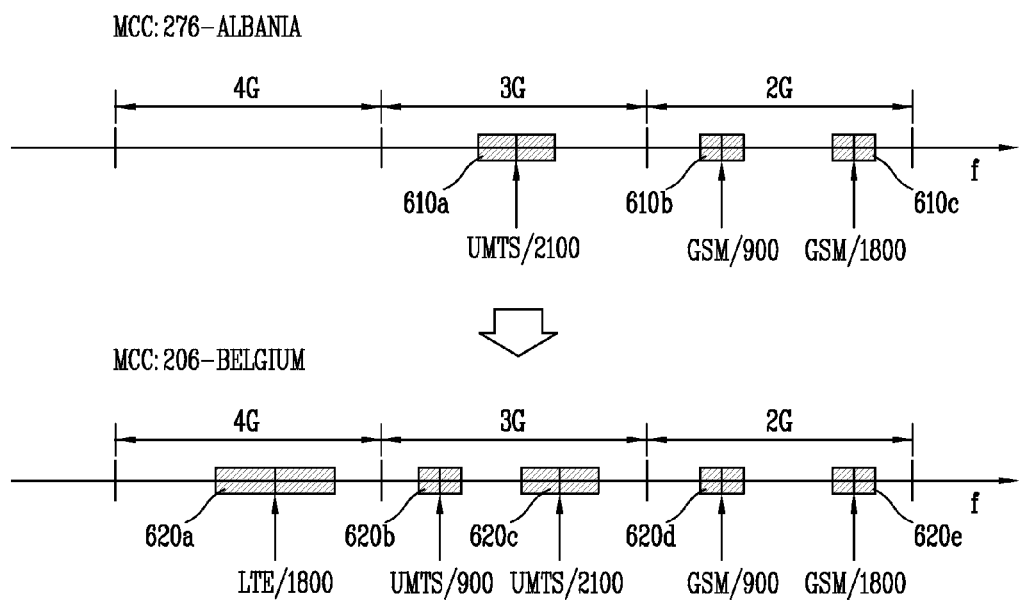
FIG. 6 is a conceptual view illustrating an embodiment of a frequency band configured by the control method illustrated in FIG. 5.
Figure 7:
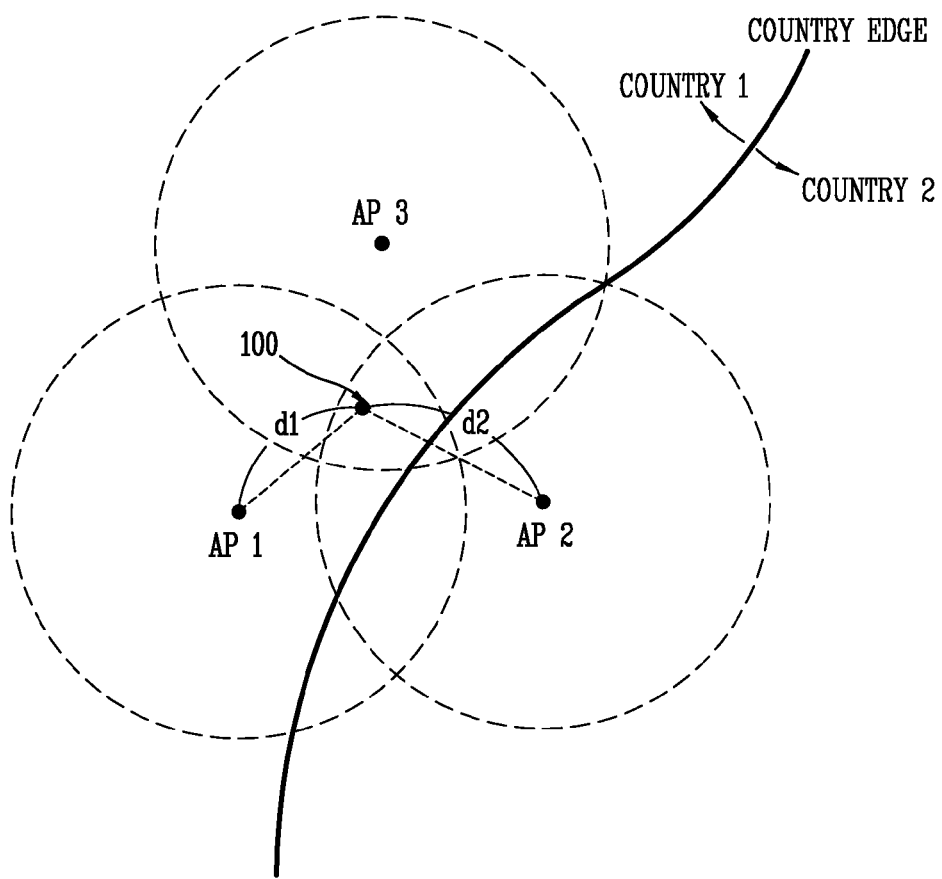
FIG. 7 is a conceptual view illustrating a method of selecting any one of different reference information when the reference information, which is a basis for configuring a frequency band, among information contained in a wireless signal received from a plurality of wireless APs are different.

Hereinafter, a method of configuring a frequency band for performing frequency search to access a mobile communication network based on a wireless signal that has been received will be described in more detail with reference to FIGS. 5 through 7. In particular, FIG. 5 is a flow chart illustrating a method of configuring a frequency band using information contained in a wireless signal according to an embodiment of the present disclosure, and FIG. 6 is a conceptual view illustrating an embodiment of a frequency band configured by the control method illustrated in FIG. 5. Further, FIG. 7 is a conceptual view illustrating a method of selecting any one of different reference information when the reference information, which is a basis for configuring a frequency band, among information contained in a wireless signal received from a plurality of wireless APs are different.

The controller 180 can extract at least one of a BSSID and an MCC from information contained in a wireless signal (beacon frame) received from an external wireless AP (S202). Here, the controller 180 determines whether or not the MCC is extracted (S204). When the MCC is extracted, the controller 180 can extract mobile communication network frequency information linked to the extracted MCC using an MCC-mobile communication network frequency information table previously stored in the memory 170 (S206). The MCC-mobile communication network frequency information table (mobile communication network frequency information linked to each MCC) may be shown as Table 2, for example.

Further, when a BSSID instead of the MCC is extracted from the information contained in the wireless signal, the controller 180 can determine (extract) an MCC linked to the BSSID based on a BSSID-MCC table (MCC information linked to each BSSID) previously stored in the memory 170 (S208). The BSSID-MCC table may be shown as Table 3, for example. Then, the controller 180 can extract (detect) mobile communication network frequency information linked to the determined MCC using the prestored MCC-mobile communication network frequency information table based on the determined MCC (S206).

Then, the controller 180 can configure a frequency band based on the extracted mobile communication network frequency information. For example, as illustrated in the first drawing of FIG. 6, when the extracted MCC is "276" (corresponds to Albania), the controller 180 can extract mobile communication network frequency information (for example, GSM 900, GSM 1800, UMTS 2100) from the MCC-mobile communication network frequency information table based on the MCC which is "276."

As described above, the mobile communication network frequency information may include radio access technology (RAT) information for accessing the mobile communication network, and reference frequency information. Furthermore, the mobile communication network frequency information may also include information corresponding to a downlink bandwidth and an uplink bandwidth.

The controller 180 can configure at least one frequency band 610*a*, 610*b*, 610*c* based on the extracted mobile communication network frequency information as illustrated in the first drawing of FIG. 6. For example, the controller 180 can configure a first frequency band 610*a* formed with a bandwidth having a predetermined size with respect to 2100 MHz based on UMTS 2100, a second frequency band 610*b* formed with a bandwidth having a predetermined size with respect to 900 MHz based on GSM 900, and a third frequency band 610*c* formed with a bandwidth having a predetermined size with respect to 1800 MHz based on GSM 1800.

Here, the bandwidth of the first through the third frequency band 610*a* to 610*c* may be determined based on the downlink bandwidth and uplink bandwidth information linked to each mobile communication network frequency information or determined by the user's setting. In another example, when the MCC extracted from the wireless signal is "206" (corresponds to Belgium), the controller 180 can extract mobile communication network frequency information (for example, GSM 900, GSM 1800, UMTS 900, UMTS 2100, LTE 1800) from the MCC-mobile communication network frequency information table based on the MCC which is "206."

Then, as illustrated in the second drawing of FIG. 6, the controller 180 can configure at least one frequency band 620a to 620e based on the mobile communication network frequency information. The controller 180 can search a frequency transmitted from a mobile communication network on the configured frequency band (S210). Here, when a plurality of frequency bands are configured, the controller 180 can determine a frequency band search sequence based on the wireless radio access technology (for example, LTE, UMTS, GSM).

For example, the frequency band search sequence can perform frequency search in the order of radio access technologies corresponding to higher generation mobile communication technologies, and in this instance, the frequency band search sequence may be in the order of LTE, UMTS and GSM. However, the present disclosure is not limited to this, the controller 180 can perform frequency search in various sequences according to the user's setting.

Furthermore, in the above, it has been described that the MCC-mobile communication network frequency information table and BSSID-MCC table are prestored in the memory 170, but is not limited to this, and the tables can be received from a wireless AP or received from an external device transmitting the tables through short-range communications. Further, when wireless signals are received from a plurality of wireless APs through the wireless communication unit, and MCCs extracted from information contained in each wireless signal are different from one another, the controller 180 can configure the frequency band based on an MCC satisfying a preset condition among the MCCs.

For example, the MCC satisfying the preset condition can be at least one of an MCC extracted from information contained in a wireless signal received from a wireless AP which is the closest to the mobile terminal among the plurality of wireless APs, an MCC having the largest number of the MCCs, and an MCC above a preset number. For example, as illustrated in FIG. 7, when the mobile terminal 100 receives a first wireless signal from a first wireless AP (AP1), and receives a second wireless signal from a second wireless AP (AP2) different from the first wireless AP (AP1), a first MCC extracted from information contained in the first wireless signal and a second MCC extracted from information contained in the second wireless signal may be different from each other.

For example, when the first MCC is an MCC corresponding to Country 1, and the second MCC is an MCC corresponding to Country 2, the controller 180 can extract mobile communication network frequency information based on an MCC (MCC1) extracted from a wireless signal received from a wireless AP which is the closest to the mobile terminal 100, for example (AP1, if d1<d2).

In another example, when different wireless signals are received from different wireless APs (AP1, AP2, AP3), at least one of MCCs extracted from the received wireless signals may be different. For example, as illustrated in FIG. 7, when an MCC extracted from a wireless signal received from the wireless AP1 and wireless AP3 is a first MCC corresponding to Country 1, and an MCC extracted from a wireless signal received from the wireless AP2 is a second MCC corresponding to Country 2, the controller 180 can extract mobile communication network frequency information based on the first MCC.

In still another example, when at least one of a plurality of MCCs extracted from a plurality of wireless signals received within a reference period of time is different, the controller 180 can extract mobile communication network frequency information based on an MCC above a preset number. Here, when there exist at least two MCCS above a preset number, the controller 180 can extract mobile communication network frequency information based on an MCC having a larger number.

The mobile terminal 100 according to another embodiment of the present disclosure may extract an MCC based on GPS information received from a GPS module as well as extract an MCC from a wireless signal received from a wireless AP. The controller 180 can receive GPS information received from a satellite through the GPS module. The GPS information may include latitude and longitude information.

A GPS information-region/country table or GPS information-MCC table may be stored in the memory 170. The controller 180 can extract a region/country based on GPS information received from the GPS module and the GPS information-region/country table. When a region/country is extracted, the controller 180 can extract an MCC corresponding to the relevant region/country. For example, a GPS information-MCC table may be stored in the memory 170, and the GPS information-MCC table may be shown below in Table 4.

TABLE 4

|  | −180~ −150 | −150~ −120 | −120~ −90 | −90~ −60 | −60~ −30 | −30~0 | 0~30 | 30~60 | 60~90 | 90~ 120 | 120~ 150 | 150~ 180 |
|---|---|---|---|---|---|---|---|---|---|---|---|---|
| 90~60 | CTNA | CTNA | CTNA | CTNA | CTEU | CTEU | CTEU | CTEU | CTEU | CTAS | CTAS | CTAS |
| 60~30 | CTNA | CTNA | CTNA | CTNA | CTNA | CTEU | CTEU | CTEU | CTAS | CTAS | CTAS (a) | CTAS |
| 30~0 | CT00 | CT00 | CTNA | CTNA | CT00 | CTAF | CTAF | CTAS, CTAF | CTAS | CTAS | CTAS | CT00 |
| 0~−30 | CT00 | CT00 | CT00 | CTSA | CTSA | CT00 | CTAF | CTAF | CT00 | CTAS | CTOC | CT00 |
| −30~−60 | CT00 | CT00 | CT00 | CTSA | CTSA | CT00 | CTAF | CT00 | CT00 | CTOC | CTOC | CTOC |
| −60~−90 | CT00 | CT00 | CT00 | CT00 | CT00 | CT00 | CT00 | CT00 | CT00 | CT00 | CT00 | CT00 |

| Division | Continental Code |
|---|---|
| Europe | CTEU |
| Asia | CTAS |
| North America | CTNA |
| Africa | CTAF |
| South America | CTSA |

TABLE 4-continued

| Oceania | CTOC |
|---------|------|
| DEFAULT | CT00 |

The vertical axis in Table 4 indicates a latitude and the horizontal axis thereof indicates a longitude. Table 4 illustrates continental codes for each latitude/longitude (information on continents). Each block in Table 4 may include country codes for the relevant latitude/longitude. For example, a block corresponding to the latitude (60~30) and longitude (120~150) corresponding to a portion (a) of Table 4 is shown in Table 5 in an enlarged manner.

TABLE 5

|    | 127 | 128 | 129 | 130 | 131 | 132 |
|----|-----|-----|-----|-----|-----|-----|
| 45 | CHN | CHN | CHN | CHN | 0   | 0   |
| 44 | CHN | CHN | CHN | CHN | 0   | CIS |
| 43 | CHN | CHN | CHN | CHN | 0   | CIS |
| 42 | CHN | CHN | 0   | 0   | 0   | CIS |
| 41 | 0   | 0   | KOR | 0   | 0   | 0   |
| 40 | KOR | KOR | KOR | 0   | 0   | 0   |
| 39 | KOR | 0   | 0   | 0   | 0   | 0   |
| 38 | KOR | KOR | 0   | 0   | 0   | 0   |
| 37 | KOR | KOR | KOR | KOR | 0   | 0   |
| 36 | KOR | KOR | KOR | 0   | 0   | 0   |
| 35 | KOR | KOR | KOR | 0   | 0   | JPN |
| 34 | KOR | KOR | JPN | JPN | JPN | JPN |
| 33 | 0   | 0   | JPN | JPN | JPN | JPN |
| 32 | 0   | JPN | JPN | JPN | JPN | JPN |
| 31 | 0   | 0   | JPN | JPN | JPN | 0   |

The vertical axis in Table 5 indicates a latitude and the horizontal axis thereof indicates a longitude. Table 5 illustrates part of a portion (a) of Table 4. As shown in Table 5, the GPS information-region/country table may include country codes (KOR, CHN, JPN, etc.) for each latitude/longitude. The memory 170 can include a GPS information-region/country table such as Tables 4 and 5, and the GPS information-region/country table may include at least one of continental codes for each latitude/longitude and country codes for each latitude/longitude. When GPS information is received from the GPS module, the controller 180 can extract a country code based on the latitude/longitude and GPS information-region/country table included in the received GPS information. Furthermore, a country code-MCC table may be stored in the memory 170, and the country code-MCC table may be shown as Table 6.

TABLE 6

| Division | Country Code | MCC |
|----------|--------------|-----|
| DEFAULT  | 0            | —   |
| Korea    | KOR          | 450 |
| Japan    | JPN          | 440 |
| China    | CHN          | 460 |
| CIS      | CIS          | 250, 255, . . . |
| Denmark  | DNK          | 238 |
| Germany  | DEU          | 262 |
| Poland   | POL          | 260 |
| Netherland | NLD        | 204 |
| Italy    | ITA          | 222 |
| . . .    | . . .        | . . . |

The controller 180 can extract a country code based on the GPS information-region/country table, and extract an MCC corresponding to the extracted country code based on the country code-MCC table. Furthermore, the controller 180 can extract an MCC based on GPS information and a GPS information-MCC table. The GPS information-MCC table may be stored in the memory 170.

The GPS information-MCC table can denote a table in which an MCC is linked to each latitude/longitude similarly to Table 5. When GPS information is received, the controller 180 can extract an MCC based on latitude/longitude information contained in the GPS information and the GPS information-MCC table. Further, when a country code other than the MCC is included in a wireless signal received from a wireless AP, the controller 180 can extract a country code from the wireless signal, and extract an MCC based on the country code-MCC table.

In other words, when an MCC included in a wireless signal received from a wireless AP and an MCC extracted based on a BSSID included in the wireless signal, the controller 180 can determine either one of the different MCCs according to a preset scheme. For example, when a first MCC included in a wireless signal received from a wireless AP and a second MCC extracted based on a BSSID included in the wireless signal received from the wireless AP are different from each other, the controller 180 can activate a GPS module, and determine the same MCC as an MCC extracted based on GPS information received through the GPS module among the first and the second MCC.

In another example, the controller 180 can determine the first MCC or determine the second MCC based on the user's setting. Then, the controller 180 can extract mobile communication network frequency information based on the determined MCC, and perform frequency search on a frequency band configured based on the extracted mobile communication network frequency information.

As described above, embodiments of the present disclosure configure a frequency band for searching a frequency transmitted from a mobile communication network based on a wireless signal received from a wireless AP, and search a frequency transmitted from a mobile communication network on the configured frequency band. Accordingly, embodiments of the present disclosure allows access to a mobile communication network with only a search for a frequency band configured based on a wireless signal, thereby reducing a time for searching a frequency to access a mobile communication network as well as decreasing battery consumption.

In addition, when a mobile terminal is moved to a region/country providing a different type of mobile communication network, embodiments of the present disclosure configure a frequency band for searching a frequency transmitted from a mobile communication network of the moved region/country, and search a frequency on the configured frequency band. Accordingly, when the mobile terminal is switched from an access state of a mobile communication network to a non-access state according to the movement of the mobile terminal, embodiments of the present disclosure allow the mobile terminal to more quickly access a mobile communication network provided from the moved location while decreasing battery consumption.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A method of controlling a mobile terminal, the method comprising:
    receiving, via a wireless communication unit, a wireless signal from an external wireless access point (AP);
    configuring, via a controller, a frequency band for searching a frequency transmitted from a mobile communication network based on information contained in the wireless signal; and
    searching a frequency transmitted from the mobile communication network on the configured frequency band,
    wherein the configured frequency band is a partial search frequency band of a full search frequency band,
    wherein the information contained in the wireless signal comprises at least one of a Basic Service Set Identification (BSSID) for identifying a basic service area of the wireless AP and a Mobile Country Code (MCC),
    wherein when wireless signals are received from a plurality of wireless APs through the wireless communication unit, and MCCs extracted from information contained in each wireless signal are different from one another, the frequency band is configured based on an MCC satisfying a preset condition among the MCCs, and
    wherein the MCC satisfying the preset condition is at least one of an MCC extracted from information contained in a wireless signal received from a wireless AP closest to the mobile terminal among the plurality of wireless APs, an MCC having a largest number of the MCCs, and an MCC above a preset number.

2. The method of claim 1, wherein the frequency band is configured based on at least one of the BSSID and the MCC extracted from the information contained in the wireless signal.

3. The method of claim 2, further comprising:
    detecting mobile communication network frequency information linked to the extracted MCC based on mobile communication network frequency information linked to each of the MCCs previously stored when the MCC is extracted from the information contained in the wireless signal; and
    configuring the frequency band using the detected mobile communication network frequency information.

4. The method of claim 3, further comprising:
    determining an MCC linked to a BSSID based on MCC information linked to each of the BSSIDs previously stored when the BSSID instead of the MCC is extracted from the information contained in the wireless signal; and
    detecting mobile communication network frequency information linked to the determined MCC based on the determined MCC.

5. The method of claim 3, wherein the mobile communication network information comprises radio access technology (RAT) information and reference frequency information for accessing the mobile communication network, and
    wherein the frequency band is configured to have a predetermined size of bandwidth based on a reference frequency corresponding to the reference frequency information.

6. The method of claim 5, wherein the predetermined size of bandwidth varies according to the radio access technology information and the reference frequency information.

7. The method of claim 5, further comprising:
    detecting a plurality of mobile communication network frequency information;
    configuring a plurality of frequency bands based on the detected plurality of mobile communication network frequency information; and
    determining a frequency band search sequence based on the radio access technology information.

8. A mobile terminal, comprising:
    a wireless communication unit configured to receive a wireless signal from an external wireless access point (AP); and
    a controller configured to:
    configure a frequency band for searching a frequency transmitted from a mobile communication network based on information contained in the wireless signal, and
    search a frequency transmitted from the mobile communication network on the configured frequency band,
    wherein the configured frequency band is a partial search frequency band of a full search frequency band,
    wherein the information contained in the wireless signal comprises at least one of a Basic Service Set Identification (BSSID) for identifying a basic service area of the wireless AP and a Mobile Country Code (MCC),
    wherein when wireless signals are received from a plurality of wireless APs through the wireless communication unit, and MCCs extracted from information contained in each wireless signal are different from one another, the controller is further configured to configure the frequency band based on an MCC satisfying a preset condition among the MCCs, and
    wherein the MCC satisfying the preset condition is at least one of an MCC extracted from information contained in a wireless signal received from a wireless AP which is the closest to the mobile terminal among the plurality of wireless APs, an MCC having the largest number of the MCCs, and an MCC above a preset number.

9. The method of claim 8, wherein the controller is further configured to configure the frequency band based on at least one of the BSSID and the MCC extracted from the information contained in the wireless signal.

10. The mobile terminal of claim 9, further comprising:
    a memory unit configured to store mobile communication network frequency information linked to each MCC,
    wherein the controller is further configured to detect mobile communication network frequency information linked to the extracted MCC based on mobile communication network frequency information linked to each of the MCCs stored in the memory unit when the MCC is extracted from the information contained in the wireless signal, and configure the frequency band using the detected mobile communication network frequency information.

11. The mobile terminal of claim 10, wherein the memory unit is further configured to store MCC information linked to each BSSID, and wherein the controller is further configured to determine an MCC linked to a BSSID based on MCC information linked to each of the BSSIDs stored in the memory unit when the BSSID instead of the MCC is extracted from the information contained in the wireless signal, and detect mobile communication network frequency information linked to the determined MCC based on the determined MCC.

12. The mobile terminal of claim 10, wherein the mobile communication network information comprises radio access technology (RAT) information and reference frequency information for accessing the relevant mobile communication network, and wherein the frequency band is formed to have a predetermined size of bandwidth based on a reference frequency corresponding to the reference frequency information.

13. The mobile terminal of claim 12, wherein the predetermined size of bandwidth varies according to the radio access technology information and the reference frequency information.

14. The mobile terminal of claim 12, wherein the controller is further configured to:

detect a plurality of frequency bands based on a plurality of mobile communication network frequency information, configure a plurality of frequency bands based on the detected plurality of mobile communication network frequency information, and determine a frequency band search sequence based on the radio access technology information.

* * * * *